R. S. SMITH.
PROCESS AND APPARATUS FOR PRODUCING ELECTRICALLY WELDED JOINTS.
APPLICATION FILED MAY 16, 1919.

1,323,556.

Patented Dec. 2, 1919.

INVENTOR
Reuben Stanley Smith
BY
Erwin, Wheeler & Woolard
ATTORNEYS.

UNITED STATES PATENT OFFICE.

REUBEN STANLEY SMITH, OF MILWAUKEE, WISCONSIN.

PROCESS AND APPARATUS FOR PRODUCING ELECTRICALLY-WELDED JOINTS.

1,323,556.    Specification of Letters Patent.    Patented Dec. 2, 1919.

Application filed May 16, 1919. Serial No. 297,453.

*To all whom it may concern:*

Be it known that I, REUBEN STANLEY SMITH, a citizen of the United States, residing in the city of Milwaukee, in the county of Milwaukee and State of Wisconsin, have invented a certain new and useful Improvement in Processes and Apparatus for Producing Electrically-Welded Joints, and do hereby declare that the following is a full, clear, and exact description thereof, such as will enable persons skilled in the art to which the invention pertains to make, use, and practise the same, reference being had to the drawings hereto attached for disclosure as to certain details of construction and arrangement.

My invention relates to a process of electrically welding two abutting metal plates on a line coincident with their meeting edges, and to an apparatus employed in carrying out such process.

The use of my apparatus and practice of my process enable me to unite the edges to be welded in a manner not heretofore known, and to produce a welded joint of novel structure.

My improved process of welding is applicable to two metal plates lying in the same plane with their abutting edges in proximity, and is equally applicable to a metal plate which has been rolled or pressed into tubular form, so that a like proximity of the edges to be welded is brought about.

In carrying my improved process into effect, I use a fusible metallic electrode of any suitable gage and composition, which when fused by the electric arc will yield sufficient material to fill the entire space between the edges of the plates, and produce a joint which is of uniform cross sectional construction at all points. And from the fused metal flowing from the electrode, I form a bead or rib as a part of the joint upon that side of the work opposite the electrode.

In automatic welding machines of the type in which a fusible metallic electrode is moved over the welding line, it is desirable that the fused metal flowing from the electrode be completely and uniformly amalgamated with the fused edges of the work so as to produce a joint of maximum strength. Generally, the fused metal flowing from the electrode has not been confined, and some of such fused metal has been free to run through the joint without being incorporated as a part of the structure thereof. The result of this has been that in some instances a defective joint has been produced by reason of this failure of the molten metal to evenly and uniformly unite with the parts to be welded. In other instances it has been attempted to arrest the flow of the fused metal through the joint by placing a metal bar or table under the work at the welding line, the work being in contact with such bar or table. But this practice has not always been productive of satisfactory results, inasmuch as the work frequently sticks to the bar or table, due to the fact that the fusing temperatures of the parts are about the same. If the voltage of the current be sufficient to completely fuse the work through from side to side, the metal bar or table at the under side thereof will sometimes be fused to the sticking point. If the voltage of the current be insufficient to fuse the work in the degree indicated, an imperfect joint will be produced. Again, this heating of the bar or table to a state of partial fusion, renders the surface thereof uneven, so that replacement becomes necessary.

By my process the amount of fused metal which is taken up in the joint is increased to a point where the whole amount of fused metal flowing from the electrode is incorporated in the union of the parts at the welding line. Thus, I eliminate the expenditure of the energy involved in the consumption of electric current used in fusing an amount of metal which does not become a part of the joint.

The heat generated by the welding current completely fuses the plate or plates to be welded through from side to side at the proximate edges thereof, so that amalgamation of the substance of the electrode and the work is effected. The bead or rib previously referred to is formed from the fused metal as it flows from the electrode, and strikes a cooling element adjacent but below the welding line.

This cooling element, as invented by me, may be in the form of a hollow bar or tube, through which water circulates, and is formed with a longitudinal groove or depression in its surface to collect the flowing metal and mold it into the form of a bead or rib, or spread such metal at the sides of the line of the joint.

In another form, the cooling element may be constituted of a bar or mandrel having an inlaid grooved strip of metal alloyed so as to possess a very high melting point, and thus the bead or rib will be formed without any liability of the work to stick, as has been already described.

I may also use an inlaid grooved strip of an alloyed metal of such characteristics and properties that it will not amalgamate with the fused work which is being welded, even though the temperature of the said strip may approach the fusing point.

In the accompanying drawings which form a part of this specification,

Figure 1:
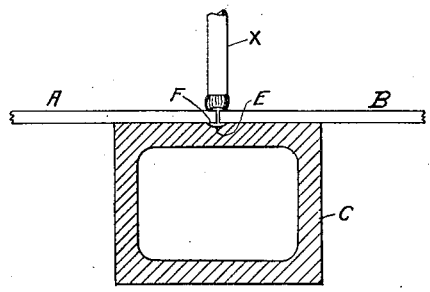
Figure 1 shows a view of a cooling device as a bar employed in applying my process in welding the abutting edges of two metal plates, the bar being shown in section.

Referring to the drawings, Fig. 1, A and B, are two metal plates arranged in a horizontal plane the abutting edges of which are to be welded. These plates will be supported in a machine provided with devices for supplying the necessary welding current and for feeding a fusible electrode X to the work as the welding progresses. The electrode may be moved along the welding line, the work being held in a stationary position at the time, or the reverse arrangement may be followed, in a manner now well known in the art of arc-welding.

For the purpose of chilling the fused metal flowing from the electrode as it is taken up in the joint, I provide a hollow bar, C, which will be arranged at the welding line under the plates A and B. The hollow portions of the bar C will be provided with pipe connections through which a cooling fluid, as water, may circulate. The length of the cooling bar C may or may not coincide with that of the plates to be welded, in case the electrode traverses the welding line; but if the electrode be relatively stationary, the work will have a traverse movement under the point of the fusible electrode, and it will not be necessary to provide a cooling element of the length of the work. It is preferable that the cooling element be stationary.

Figure 2:
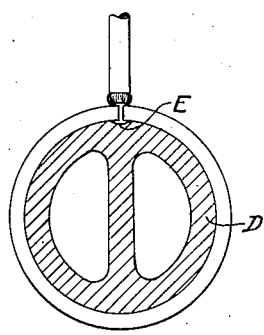
Fig. 2 shows a like sectional view of a cooling device as a mandrel employed in applying my process in welding the abutting edges of a tube, which latter has been formed by rolling or pressing a metal plate into the desired shape.

In Fig. 2, I have shown my invention as applied to the operation of welding the abutting edges of a plate formed as a tube, a hollow mandrel D, being employed as the cooling element, and provided with pipe connections for the circulation of the cooling fluid.

The hollow bar C, in Fig. 1, as well as the hollow mandrel D, in Fig. 2, is provided with a groove or channel E, the bottom of which is but slightly below the surface of the bar or mandrel. This groove or channel establishes an open space between the work and the bar or mandrel, so that the work does not contact with the bar or mandrel at the welding line. As a consequence of this arrangement, the voltage of the current employed to heat the edges of the plate or plates at the welding line may be sufficient to thoroughly fuse the said edges without any liability of fusing the bar or mandrel.

In the operation of my process, the molten metal flowing from the fused electrode will be collected in the groove or channel E, and will form a bead or rib F, at the under side of the joint, effecting a complete fusion of the surfaces to be welded, and reinforcing such joint. The lower temperature of the bar or mandrel, due to the air space between the parts, will permit the welding operation to be completed without the work sticking to the bar or mandrel. The formation of the bead or rib F, will be greatly facilitated by the employment of the cooling devices hereinbefore referred to. This element, being cooled by the circulation of the water, will be maintained at a low temperature during the welding operation, and will chill the molten metal flowing from the fusible electrode, so that the bead or rib will form at the moment of contact of the molten metal with the said element. The groove or channel E, will confine the fused metal, and impart symmetrical lines to the bead or rib. The welded joint is thus materially strengthened.

Figure 3:
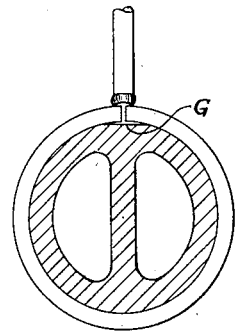
Fig. 3 shows a similar construction in which the surface of the mandrel is flattened, instead of being grooved, as in Fig. 2.

In Fig. 3, I have shown the mandrel as provided with a flattened longitudinal surface G, over which the edges to be welded are placed. This flattened surface will act to collect the molten metal and permit the same to spread out at each side of the welding line, as in the construction described with reference to Fig. 2.

Figure 4:
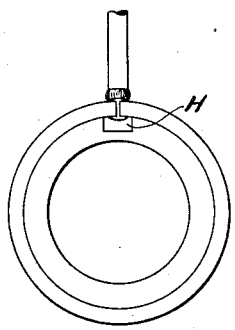
Fig. 4 shows a modification in which the welding mandrel is provided with an inlaid strip of metal of high fusing point.

In Fig. 4, I have shown a mandrel as channeled for the reception of an inlaid strip H, of a metal of very high fusing point, so that there will be no tendency of the work to stick to the mandrel while the welding of the tube is being carried on. On account of the difference in the welding temperatures of the work and the inlaid strip H, the fused metal flowing from the electrode will be chilled by contact with the said strip and will form a bead or rib, as before.

Inasmuch as it is not material to the purposes of my invention whether the rib-forming groove be in a plane surface as in Fig. 1, or in a curved surface as in Fig. 2, I have denominated the bar C and the mandrel D, as a "work support" in some of the generic claims, and by such terms I mean to include both structures as within the scope of such claims. Likewise, the groove or channel E, in Figs. 1 and 2, and the flat surface or depression G, in Fig. 3, is the "mold" referred to in some of the claims, it being within the scope of my invention that the space into which the fused metal flows from the electrode may be of any form which will enable such fused metal to expand at each side of the line of the welding joint, to form a bead or rib and reinforce the joint.

Having thus described my invention, what I claim and desire to secure by Letters Patent is:—

1. In an electric-welding machine, a fusible metallic electrode for transmitting the welding current, in combination with means for supporting the work with the edges to be welded in proximity, said work support being provided with a mold to receive the fused metal flowing from the electrode, and form a bead or rib upon the work coincident with the welding line.

2. In an electric-welding machine, a fusible metallic electrode for transmitting the welding current, in combination with means to support the work with the edges to be welded in proximity, and means to mold the fused metal flowing from the electrode into a bead or rib at the welding line.

3. In an electric-welding machine, a fusible metallic electrode for transmitting the welding current, in combination with a mandrel for supporting the work with the edges to be welded in proximity, said mandrel having a groove to receive the fused metal flowing from the electrode and mold a bead or rib upon the work at the welding line.

4. In an electric-welding machine, a water-cooled mandrel having a mold in the surface thereof, to receive the fused metal flowing from the electrode of the machine and form a bead or rib upon the work at the welding line.

5. In an electric-welding machine, a fusible metallic electrode for transmitting the welding current, in combination with a water-cooled mandrel for supporting the work with the edges to be welded in proximity, the said mandrel having a mold in which the fused metal flowing from the electrode is chilled into a bead or rib at the welding line.

6. The method of producing electrically welded joints, which consists in bringing into proximity the edges of the work to be welded, applying a welding current by means of a fusible metallic electrode at one side of the work, and chilling the fused metal flowing from the electrode to form a bead or rib at the other side of the work.

7. The method of producing electrically welded joints, which consists in bringing into proximity the edges of the work to be welded, applying a welding current to said edges at one side of the work, and forming a bead or rib at the other side by collecting and chilling the fused metal.

8. The method of producing electrically welded joints, which consists in bringing into proximity the edges of the work to be welded, applying a welding current to said edges at one side of the work, and forming a bead or rib at the other side by chilling the fused metal.

9. The method of producing electrically welded joints, which consists in heating the edges to be welded to a fusing temperature and chilling the fused metal to form a bead or rib at the underside of the welding line.

10. The method of producing electrically welded joints, which consists in bringing into proximity the edges to be welded, applying a welding current to said edges at one side of the work, and forming a bead or rib at the other side by spreading the fused metal at each side of the welding line.

11. In an electric welding machine, a mandrel having a mold in the surface thereof to receive the fused metal and spread the latter at each side of the welding line to form a bead or rib upon the work.

In testimony whereof I have signed my name at Milwaukee, Wisconsin, this 12th day of May, 1919.

R. STANLEY SMITH.

Witnesses:
W. F. WOOLARD,
LEVERETT C. WHEELER.